United States Patent
Zveglich

[11] Patent Number: 5,539,410
[45] Date of Patent: Jul. 23, 1996

[54] PULSE DOPPLER PROXIMITY SENSOR

[75] Inventor: Joseph E. Zveglich, Scottsdale, Ariz.

[73] Assignee: Motorola, Inc., Schaumburg, Ill.

[21] Appl. No.: 844,334

[22] Filed: Mar. 2, 1992

[51] Int. Cl.⁶ .................................................. F42C 13/04
[52] U.S. Cl. .............................. 342/68; 342/131; 102/214
[58] Field of Search .............................. 342/68, 129, 130, 342/131; 102/214

[56] References Cited

U.S. PATENT DOCUMENTS

| | | | |
|---|---|---|---|
| 3,161,874 | 12/1964 | Page | 343/7.7 |
| 3,889,261 | 6/1975 | Sirven | 342/131 X |
| 4,059,052 | 11/1977 | Karr | 102/214 |
| 4,450,444 | 5/1984 | Wehner et al. | 343/5 CM |
| 4,622,555 | 11/1986 | Doggett et al. | 342/84 |
| 4,914,441 | 4/1990 | Brookner | 342/161 |
| 5,053,772 | 10/1991 | Lamper et al. | 342/25 |

Primary Examiner—Daniel T. Pihulic
Attorney, Agent, or Firm—Frank J. Bogacz

[57] ABSTRACT

A pulse Doppler proximity sensor uses a plurality of stepped output radio signals for accurately determining the relative range between the proximity sensor and an object. A dual modulation technique is employed which incorporates a pulse modulation arrangement and a carrier frequency modulation arrangement to detect the necessary range accurately from the plurality of output radio signals. The proximity sensor processes in parallel each of the plurality of output radio signals returned from the object. A binary comparison is made and the comparison is integrated over time to prevent false alarms. The pulse Doppler proximity sensor is particularly useful in fuzing arrangements for a munition in which a number of range settings are desired.

18 Claims, 3 Drawing Sheets

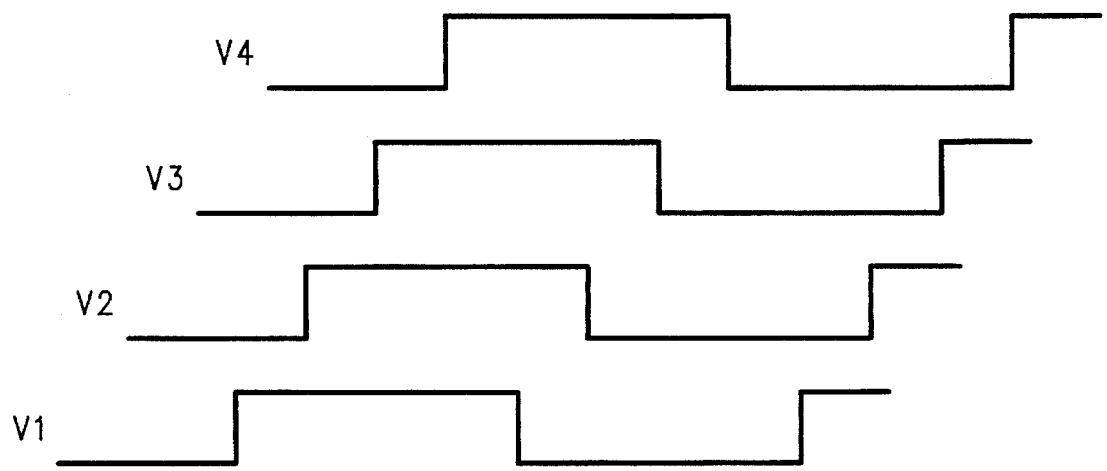
DOPPLER PHASE RELATIONSHIP BETWEEN
ZERO RANGE AND CROSS-OVER RANGE
*FIG. 3*
*FIG. 4*
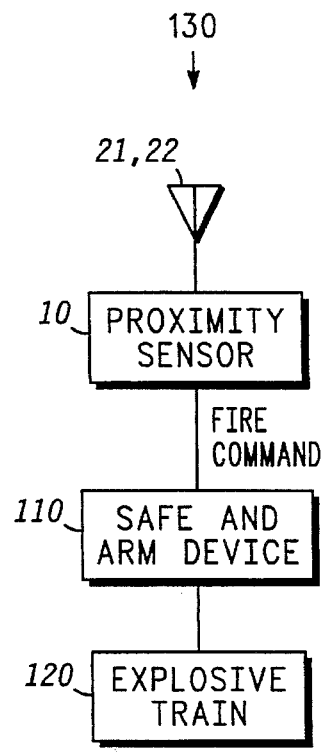

PULSE DOPPLER PROXIMITY SENSOR

BACKGROUND OF THE INVENTION

The present invention pertains to fuzing and more particularly to a pulse Doppler proximity sensor for permitting selectable height of burst fuzing.

Fuzing controls the detonation of munitions at particular times and at particular distances from the earth or other objects. In order for fuzing to detonate munitions at the appropriate time, a proximity sensor of the fuze must determine the range of the fuze with respect to other objects such as the earth. Such fuzing may use radar ranging techniques to determine distance between the munitions and an object.

In low altitude height of burst fuzing situations, there is difficulty in detonation of the munition by the fuzing due to difficulties in detecting the proper range. Height of burst selectability may include detonating at two or more ranges less than 25 feet from an object or target. Presently such radar ranging is accomplished by frequency modulated continuous wave (FM-CW) and by pulsed Doppler technologies. When munitions are deployed in close proximity or clusters, the FM-CW approaches are susceptible to interference between the transmitting and receiving portions of each munition and among the many rounds of munitions deployed. For pulsed Doppler continuous wave applications, the ranging is too short to detect low altitude height for bursts for detonating at less than 25 feet.

Accordingly, it is highly desirable to obtain a proximity sensor for munition fuzing which is very accurate at short range proximity sensing in the presence of a large number of mutually interfering sensors.

SUMMARY OF THE INVENTION

In accordance with the present invention, a novel proximity sensor for use in a fuze of munitions is shown.

A pulse Doppler proximity sensor detects range with respect to an object. The pulse Doppler proximity sensor includes a transmitting arrangement for outputting a plurality of output signals of distinct frequencies toward the object. A receiving arrangement is also included in the sensor which receives a plurality of reflected signals of distinct frequencies. The reflected signals are reflected from the object and result from the output signals impinging upon the object.

A plurality of channels are coupled to the means for receiving. The channels provide a plurality of corresponding binary signals representing Doppler phase relationships of the reflected signals from the object. A comparator is coupled to the plurality of channels. Each of the plurality of corresponding binary signals is compared by the comparator. The comparator then provides a range signal when the pulse Doppler proximity sensor is at a preset range with respect to the object.

BRIEF DESCRIPTION OF THE DRAWING

FIG. 3 is a waveform diagram of the Doppler channel outputs.

FIG. 4 is a diagram of a round of munition including the proximity sensor embodying the present invention.

DESCRIPTION OF THE PREFERRED EMBODIMENT

Figure 1:
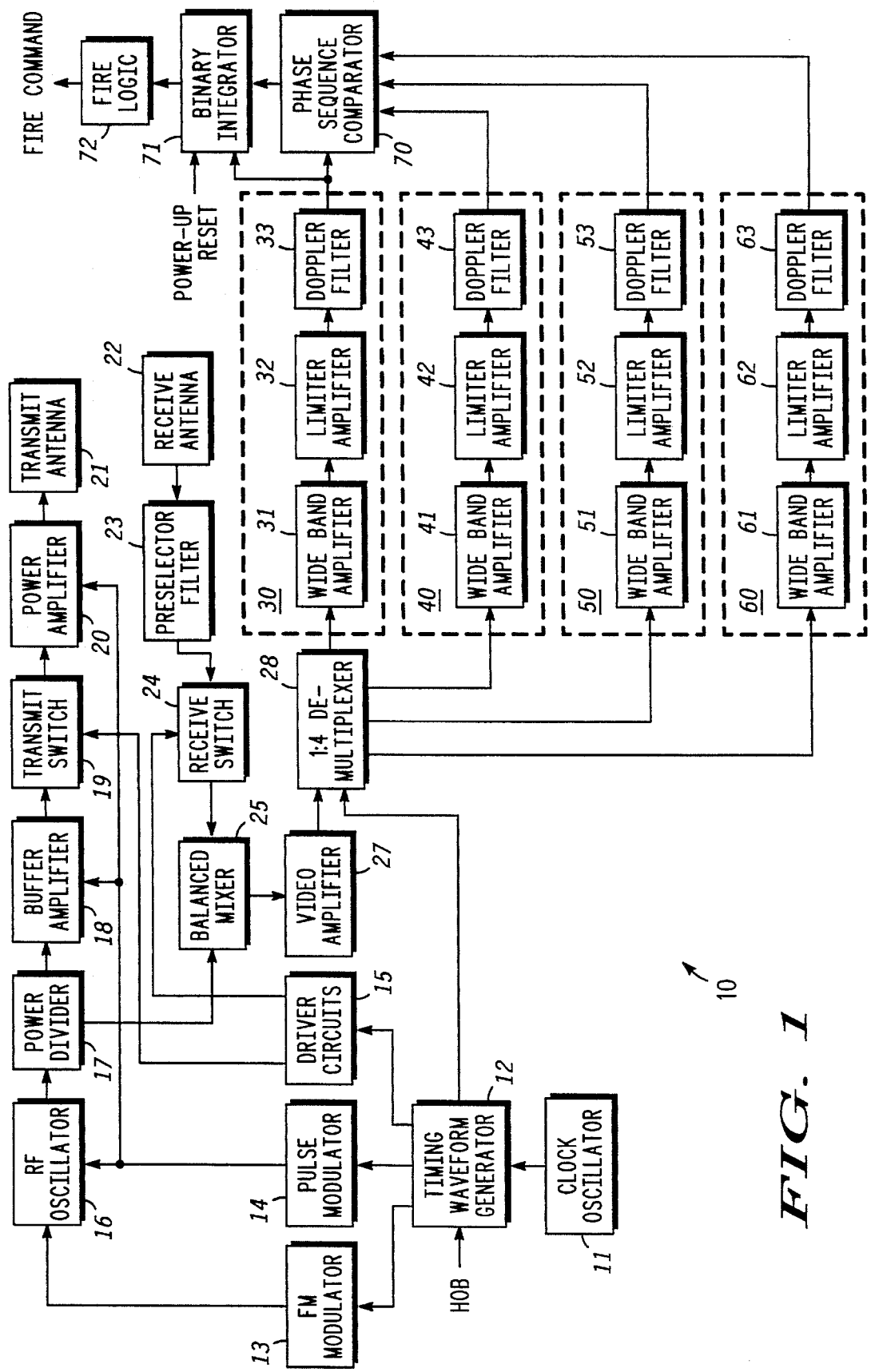
FIG. 1 is a block diagram of a proximity sensor in accordance with the present invention.

Referring to FIG. 1 a block diagram of a proximity sensor 10 for use in a fuze is shown. Clock oscillator 11 provides all timing for the proximity sensor circuit 10. Clock oscillator 11 provides a square wave output to timing waveform generator 12. The frequency of clock oscillator 11 may be in the 20 MHz frequency range, for example. An input to timing waveform generator 12 is the height of burst (HOB) input. Timing waveform generator 12 generates the necessary waveforms based upon the height of burst input. For the present invention, typically height of burst selections are set for low height of burst approximately 5 feet + or − 5 feet or 30 feet + or − 5 feet.

Timing waveform generator 12 is coupled to FM modulator 13, pulse modulator 14, and driver circuits 15. Timing waveform generator 12 divides the basic clock oscillator frequency by 64 or 128, for example. Then the timing waveform generator 12 divides again by 4 to produce four distinct frequencies for transmission to FM modulator 13. FM modulator 13 converts the digital signals to analog signals to generate voltages to bias RF oscillator 16 for generating the four distinct frequencies to be transmitted. Although four frequencies have been selected for transmission to perform the ranging step, any number of signals may be transmitted between 2 and N. The number of Doppler channels (30, 40, 50, 60) required will correspond to the number of distinct frequencies employed. Two signals represents a minimal configuration for the present environment to operate in while N represents a very large number of signals that may be transmitted to perform the ranging. Selection of the number of signals to be transmitted is a cost versus discriminating against range ambiguities determination. The greater the number of signals sent and received from a object or target, the more distance to the first range ambiguity. The fewer number of transmitted signals, the nearer the first range ambiguity will be. Driver circuits 15 is coupled to transmit switch 19.

Pulse modulator 14 places the particular modulation in binary form. Pulse modulator 14 is coupled to RF oscillator 16, buffer amplifier 18, transmit switch 19, and power amplifier 20. Pulse modulator 14 modulates the carrier frequency in substantially equally spaced frequency steps. This may be done by a varactor diode modulator biased by a step control voltage. RF oscillator 16 is coupled to power divider 17. Power divider 17 splits the power for transmitting and receiving. Power divider 17 is coupled to buffer amplifier 18 and to balanced mixer 25. Buffer amplifier 18 amplifies the four output signals for transmission. Buffer amplifier 18 is coupled to transmit switch 19. Transmit switch 19 is coupled to power amplifier 20. Power amplifier 20 amplifies the four output signals for transmission. Power amplifier 20 is coupled to transmit antenna 21. Transmit antenna 21 sends the four output radio signals comprising four distinct frequencies out toward the object or target so that these signals may impact the object or target and be returned to the proximity sensor for processing.

Receive antenna 22 receives the reflections of the four output radio signals and transmits the signals to preselector filter 23. Preselector filter 23 filters out unwanted signals in the receive path to attenuate high out-of-band EMI signals in order to function normally in the environment. Receive switch 24 operates in a similar fashion to that of transmit switch 19. That is, receive switch 24 creates a window for receiving the return signals so as to reject any ambiguous signals. The receive switch 24 is coupled to driver circuits 15.

Receive switch 24 is coupled to balance mixer 25. Balance mixer 25 acts as a down converter and converts the returned four output signals to bipolar video signal pulses derived from the target returns. The output of balanced mixer 25 is coupled to video amplifier 27. The output of balanced mixer 25 includes interlaced bipolar video signal pulses derived from the target returns of each sequential frequency of the four output signals. Video amplifier 27 provides common signal amplification and establishes the noise level for the proper operation of sensor circuit 10. The reflected signals of the four output signals are converted to baseband establishing a noise floor.

One-to-four demultiplexer 28 is coupled to video amplifier 27 and timing waveform generator 12. Demultiplexer 28 recovers and separates into four corresponding Doppler channels the reflected signals of the four output signals. Demultiplexer 28 operates by sample-and-hold to detect each of the four Doppler channels. The four Doppler channels 30, 40, 50, and 60 each receive the Doppler signals from one of the four corresponding output signals which are reflected back to the proximity sensor.

Each Doppler channel (30–60) includes a wideband amplifier, a limiter, and a Doppler filter including analog-to-digital circuits. Doppler channel 30 includes wideband amplifier 31 coupled to demultiplexer 28, limiter amplifier 32 coupled to wideband amplifier 31, and Doppler filter 33 coupled between limiter amplifier 32 and phase sequence comparator 70. Similarly, Doppler channel 40 includes wideband amplifier 41 coupled to demultiplexer 28, limiter amplifier 42 coupled to wideband amplifier 41, and Doppler filter 43 coupled between limiter amplifier 42 and phase sequence comparator 70. Doppler channel 50 includes wideband amplifier 51 coupled to demultiplexer 28, limiter amplifier 52 coupled to wideband amplifier 51, and Doppler filter 53 coupled between limiter amplifier 52 and phase sequence comparator 70. Doppler channel 60 includes wideband amplifier 61 coupled to demultiplexer 28, limiter amplifier 62 coupled to wideband amplifier 61, and Doppler filter 63 coupled between limiter amplifier 62 and phase sequence comparator 70.

The sampling process via each of the wideband amplifiers (31, 41, 51, 61) converts video noise to a half-sampling frequency noise bandwidth. The limiter amplifiers (32, 42, 52, 62) convert the noise voltage to binary voltage states which insures that the amplified signals will be within a certain bandwidth exceeding the noise levels. The limiter amplifier limits the noise energy associated with a number of mutually interfering proximity sensors prior to Doppler filtering. As a result, the signal to noise ratio of the reflected signal is improved. Each of the Doppler filters (33, 43, 53, 63) operates as a bandpass filter in the preferred embodiment in the range of 400 Hz to 5 kHz and improves the detection of signal to noise ratio by reducing the equivalent noise bandwidth. In addition, the analog-to-digital portion for digital implementations (or zero crossing comparators for analog implementations) of Doppler filters (33, 43, 53, 63) simplify the implementation by operating directly with logic level signals. These logic level signals of Doppler filters 33, 43, 53, 63 are transmitted to phase sequence comparator 70.

Phase sequence comparator 70 operates to compare the binary phase relationships of the Doppler signals of Doppler channels 30, 40, 50, and 60. Phase sequence comparator 70 provides a logical output when the selected target range conditions exist. When the target or object moves into the selected detection range, the phase relationship of alternate Doppler channels (30, 40, 50, 60) Doppler signals exhibit less than a 180° of phase difference. Phase sequence comparator 70 detects this condition with sequential logic to be discussed infra by using state transition of one signal to store the phase state of the compared signal. In the present example, since there are four Doppler pulses, there are eight transitions (up and down) of the four signals. These eight transitions are stored corresponding to phase states. A logical AND of these stored condition provides a detection opportunity for the proximity detector for each Doppler cycle.

Phase sequence comparator 70 is coupled to binary integrator 71. Depending on the false alarm tolerance specified for the particular type of munition, the probability of detection based on noise at the output of phase sequence comparator 70 may exceed the requirements for false alarm detection. Therefore, binary integrator 71 in the form of a up-down counter is a way of inhibiting such false alarms to produce firing of the munition. The output of phase sequence comparator 70 controls the up-down control of binary integrator 71. When a particular threshold count (preset) is achieved, binary integrator 71 produces a signal to fire logic 72. Fire logic 72 then produces the fire command to trigger the fuze detonation and subsequent firing of the round of munition. Table 1 indicates the cycle (N) count or threshold of binary integrator 71, the probability of a firing decision based on noise (Pn) and the false alarm probability (Pfa). The Pfa table entries are related to a 9.4 kHz predetection noise bandwidth and a 60 second operating time.

TABLE 1

| Cycle Count Threshold N | Pn | Pfa |
|---|---|---|
| 1 | 1.53E-5 | 1.0 |
| 2 | 2.33E-10 | 1.31E-4 |
| 3 | 3.35E-15 | 1.33E-9 |
| 4 | 5.42E-20 | 1.52E-14 |
| 5 | 8.27E-25 | 1.86E-19 |
| 6 | 1.26E-29 | 2.37E-24 |
| 7 | 1.93E-34 | 3.10E-29 |
| 8 | 2.94E-39 | 4.13E-34 |

For example, a binary integrator threshold count of 3 or greater is required to meet a false alarm probability of 1E-4 ($10^{-4}$).

Figure 2:
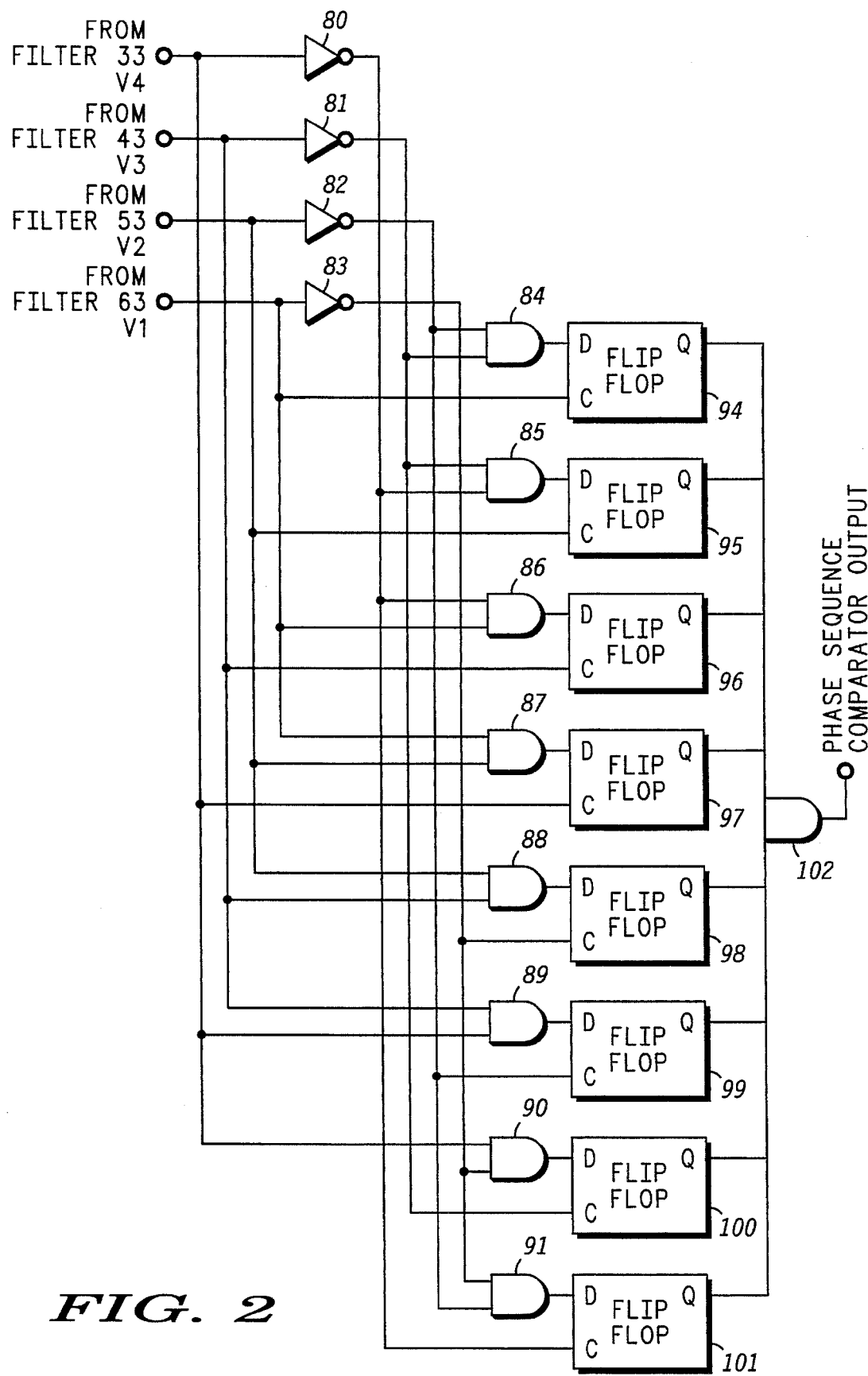
FIG. 2 is a logic diagram of the phase sequence comparator of FIG. 1.

FIG. 2 depicts the combination logic comprising the phase sequence comparator 70 of FIG. 1. V4-V1 represent the output of Doppler filters 33, 43, 53, 63 respectively. V4-V1 are respectively connected to inverters 80–83. Lead V4 is also connected to AND gates 89 and 90 and to flip-flop 97. Lead V3 is connected to flip-flop 96 and to AND gates 88 and 89. Lead V2 is connected to flip-flop 95 and to AND gates 87 and 88. Lead V1 is connected to flip-flop 94 and to AND gates 86 and 87.

The output of inverter 80 is connected to AND gates 85 and 86 and to flip-flop 101. The output of inverter 81 is connected to AND gates 84 and 85 and to flip-flop 100. The output of inverter 82 is connected to AND gates 84 and 91 and to flip-flop 99. The output of inverter 83 is connected to AND gates 90 and 91 and to flip-flop 98.

AND gates 84–91 are respectively connected to the D inputs of flip-flops 94–101 which are connected to AND gate 102 which provides the phase sequence comparator output.

Referring to FIG. 3, the relationship of the signals on leads V4-V1 is shown. When the signals are overlapping as shown in FIG. 3, the output of the phase sequence comparator 70 provides a logic 1 output which is collected by binary integrator 71. When an object or target is in the desired detection range, the phase relationship of alternate Doppler channel signals, such as V1 and V3, exhibits less than a 180° phase difference as shown in FIG. 3.

It should be appreciated that the proximity sensor embodying the present invention is simple and relatively low in cost. Further, it should be appreciated that as little as two Doppler channels may be employed to detect a high or different ranges. However, the distance to the first range ambiguity may be increased by adding a greater number of channels. The added channels, however, comprise minimal hardware. Since these munitions may be deployed in clusters, the present invention solves the problem of mutually interfering proximity sensors as well as providing short-range detection before firing.

FIG. 4 depicts a round of munition 130. The transmit and receive antennas 21 and 22 are coupled to proximity sensor 10. Proximity sensor 10 produces the fire command which is transmitted to safe and arm device 110. Safe and arm device 110 may include a detonator and provides for holding the round of munition in a safe state until it is deployed. The arming function of safe and arm device 110 provides for preparing to fire the round of munition. Safe and arm device 110 triggers the explosive train 120. Explosive train 120 includes the main explosive and other lead or booster-type explosives.

Due to the number of frequency signals output by proximity sensor 10, the detonation of the round of munitions 130 is very difficult to jam and relatively insensitive to false alarm signals. The present invention embodied in the proximity sensor combines the advantages of short range accuracy of a FM continuous wave proximity sensor with the advantage of excellent resistance to mutual interference of pulse Doppler proximity sensors while avoiding the disadvantages of both.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A pulse Doppler proximity sensor for detecting range with respect to an object, said pulse Doppler proximity sensor comprising:

means for transmitting a plurality output signals of distinct frequencies toward said object;

means for receiving a plurality of reflected signals of distinct frequencies, said reflected signals being reflected from said output signals impinging upon said object;

a plurality of channel means coupled to said means for receiving, said plurality of channel means providing a plurality of corresponding binary signals representing Doppler phase relationships of said reflected signals;

each of said channel means includes wideband amplifier means coupled to said means for receiving said wideband amplifier means for converting video noise to frequency noise voltages; and means for comparing coupled to said plurality of channel means, said means for comparing each of said plurality of corresponding binary signals to provide a range signal when said proximity sensor is at a preset range with respect to said object.

2. A munition round comprising:

an explosive train for providing an explosion in response to being armed;

antenna means for receiving and transmitting radio signals;

safe and arm means for holding said fuzing arrangement in a safe state and for arming a device in response to a fire command; and pulse Doppler proximity sensor means coupled between said antenna means and said safe and arm means, said pulse Doppler proximity sensor means adapted to provide said firing command, said pulse Doppler proximity sensor means including:

means for transmitting a plurality of output radio signals of distinct frequencies toward an object;

means for receiving a plurality of reflected radio signals of distinct frequencies, said reflected radio signals being reflected from said radio output signals impinging upon said object;

a plurality of channel means coupled to said means for receiving, said plurality of channel means providing a plurality of corresponding binary signals representing Doppler phase relationships of said reflected radio signals;

each of said channel means includes wideband amplifier means coupled to said means for receiving said wideband amplifier means for converting video noise to frequency noise voltages; and means for comparing coupled to said plurality of channel means said means for comparing each of the plurality of corresponding binary signals to provide said fire command when said pulse Doppler proximity sensor means is at a preset range with respect to said object.

3. A pulse Doppler proximity sensor as claimed in claim 1, wherein each of said channel means further includes limiter amplifier means coupled to said wideband amplifier means said limiter amplifier means for converting said frequency noise voltages to binary range signals.

4. A pulse Doppler proximity sensor as claimed in claim 3, wherein each of said channel means further includes Doppler filter means coupled to said limiter amplifier means, said Doppler filter means for reducing bandwidth of said binary range signals.

5. A pulse Doppler proximity sensor as claimed in claim 4, wherein said means for comparing includes phase sequence comparator means coupled to said Doppler filter means of each of said plurality of channel means, said phase sequence comparator means operating in response to said binary range signals of each of said Doppler filter means to produce an instantaneous indication of said range of said proximity sensor with respect to said object.

6. A pulse Doppler proximity sensor as claimed in claim 5, wherein said means for comparing further includes binary integration means coupled to said phase sequence comparator means and to at least one of said Doppler filter means, said binary integrator means integrating each of said instantaneous indications over a particular time period and providing a command output when said instantaneous indications exceed a predetermined threshold.

7. A pulse Doppler proximity sensor as claimed in claim 6, wherein said means for receiving includes demultiplexer means coupled to said wideband amplifier means of each of said plurality of channel means, said demultiplexer means transmitting each of said plurality of reflected signals of distinct frequencies to a corresponding one of said wideband amplifier means.

8. A pulse Doppler proximity sensor as claimed in claim 7, wherein said means for transmitting includes means for selecting said predetermined range between said proximity sensor and said object for providing said command signal, said means for selecting coupled to said demultiplexer means.

9. A pulse Doppler proximity sensor as claimed in claim 8, wherein said means for transmitting further includes:

FM modulator means coupled to said means for selecting, said FM modulator means generating a plurality of bias voltages corresponding to said plurality of output signals of distinct frequencies; and pulse modulator means coupled to said means for selecting, said pulse modulation means for producing said plurality of output signals of distinct frequencies in binary form.

10. A pulse Doppler proximity sensor as claimed in claim 5, wherein said phase sequence comparator means includes inverting means coupled to said Doppler filter means of each of said plurality of channel means, said inverting means for providing inverted binary range signals.

11. A pulse Doppler proximity sensor as claimed in claim 10, wherein said phase sequence comparator means further includes first gating means coupled to said inverting means and to said Doppler filter means of each of said plurality of channel means, said first gating means combining said binary range signals and said inverted binary range signals to produce a plurality of intermediate output signals.

12. A pulse Doppler proximity sensor as claimed in claim 11, wherein said phase sequence comparator means further includes latching means coupled to said first gating means and to said Doppler filter means of each of said plurality of channel means said latching means for storing each of said plurality of intermediate output signals.

13. A pulse Doppler proximity sensor as claimed in claim 12, wherein said phase sequence comparator means further includes second gating means coupled to said latching means, said second gating means producing said instantaneous indication of a first logic value in response to each of said stored intermediate output signals being of a first logic value.

14. A fuzing arrangement comprising:

antenna means for receiving and transmitting radio signals;

safe and arm means for holding said fuzing arrangement in a safe state and for arming said fuzing arrangement in response to a fire command; and pulse Doppler proximity sensor means coupled between said antenna means and said safe and arm means, said pulse Doppler proximity sensor means adapted to provide said firing command, said pulse Doppler proximity sensor means including:

means for transmitting a plurality of output radio signals of distinct frequencies toward an object;

means for receiving a plurality of reflected radio signals of distinct frequencies, said reflected radio signals being reflected from said radio output signals impinging upon said object;

a plurality of channel means coupled to said means for receiving, said plurality of channel means providing a plurality of corresponding binary signals representing Doppler phase relationships of said reflected radio signals;

each of said channel means includes wideband amplifier means coupled to said means for receiving said wideband amplifier means for converting video noise to frequency noise voltages; and means for comparing coupled to said plurality of channel means said means for comparing each of the plurality of corresponding binary signals to provide said fire command when said pulse Doppler proximity sensor means is at a preset range with respect to said object.

15. A fuzing arrangement as claimed in claim 14, wherein each of said channel means further includes limiter amplifier means coupled to said wideband amplifier means, said limiter amplifier means for converting said frequency noise voltages to binary range signals.

16. A fuzing arrangement as claimed in claim 15, wherein each of said channel means further includes Doppler filter means coupled to said limiter amplifier means, said Doppler filter means for reducing bandwidth of said binary range signals.

17. A fuzing arrangement as claimed in claim 16, wherein said means for comparing includes phase sequence comparator means coupled to said Doppler filter means of each of said plurality of channel means, said phase sequence comparator means operating in response to said binary range signals of each of said Doppler filter means to produce an instantaneous indication of said range of said proximity sensor with respect to said object.

18. A fuzing arrangement as claimed in claim 17, wherein said means for comparing further includes binary integration means coupled to said phase sequence comparator means and to at least one of said Doppler filter means, said binary integrator means integrating each of said instantaneous indications over a particular time period and providing said fire command when said instantaneous indications exceed a predetermined threshold.

* * * * *